J. S. TURNER.
AUTOMOBILE BED.
APPLICATION FILED MAR. 22, 1920.
1,363,627.
Patented Dec. 28, 1920.
2 SHEETS—SHEET 1.
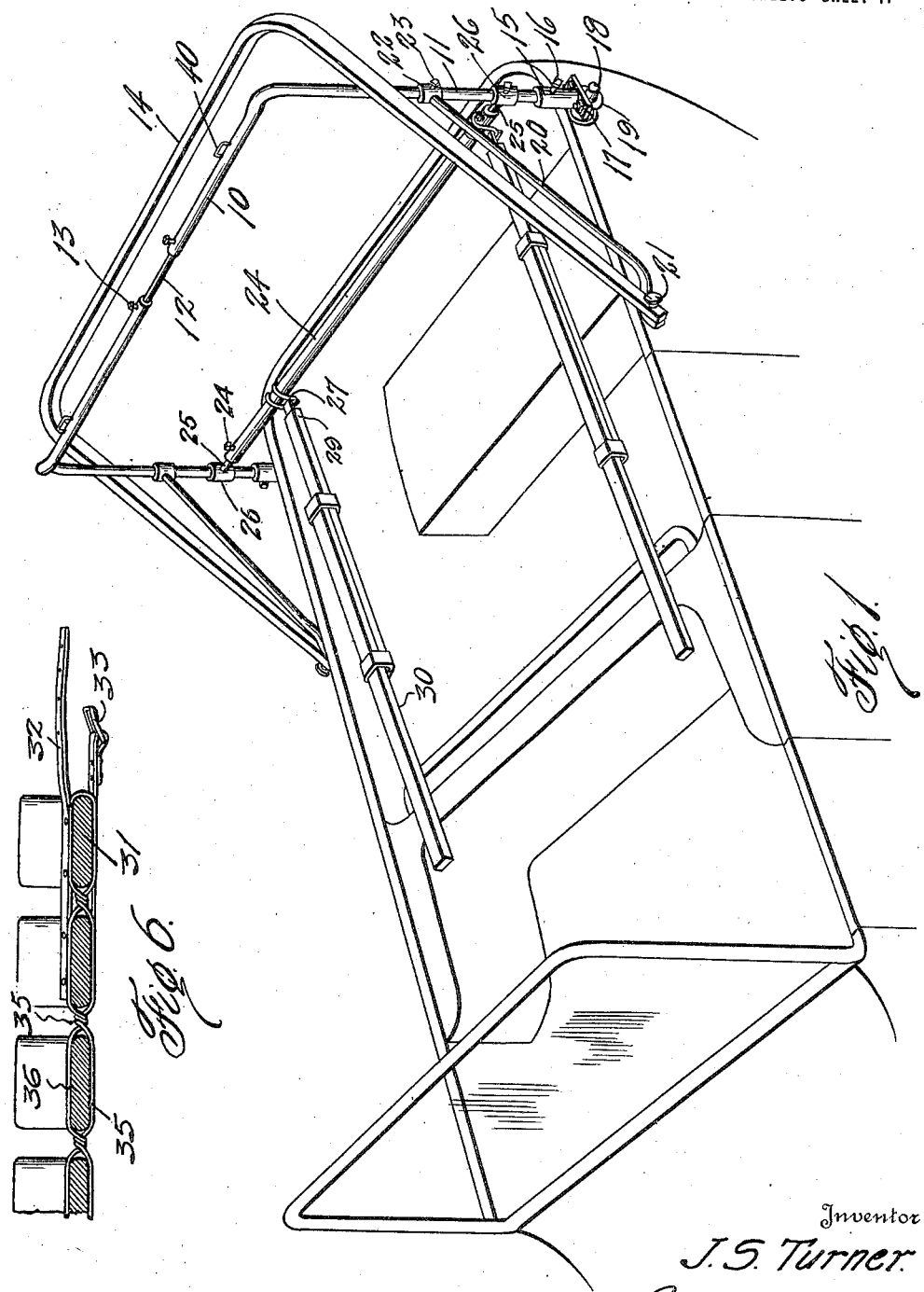
Inventor
J. S. Turner
By Jack A. Ohly
Attorney

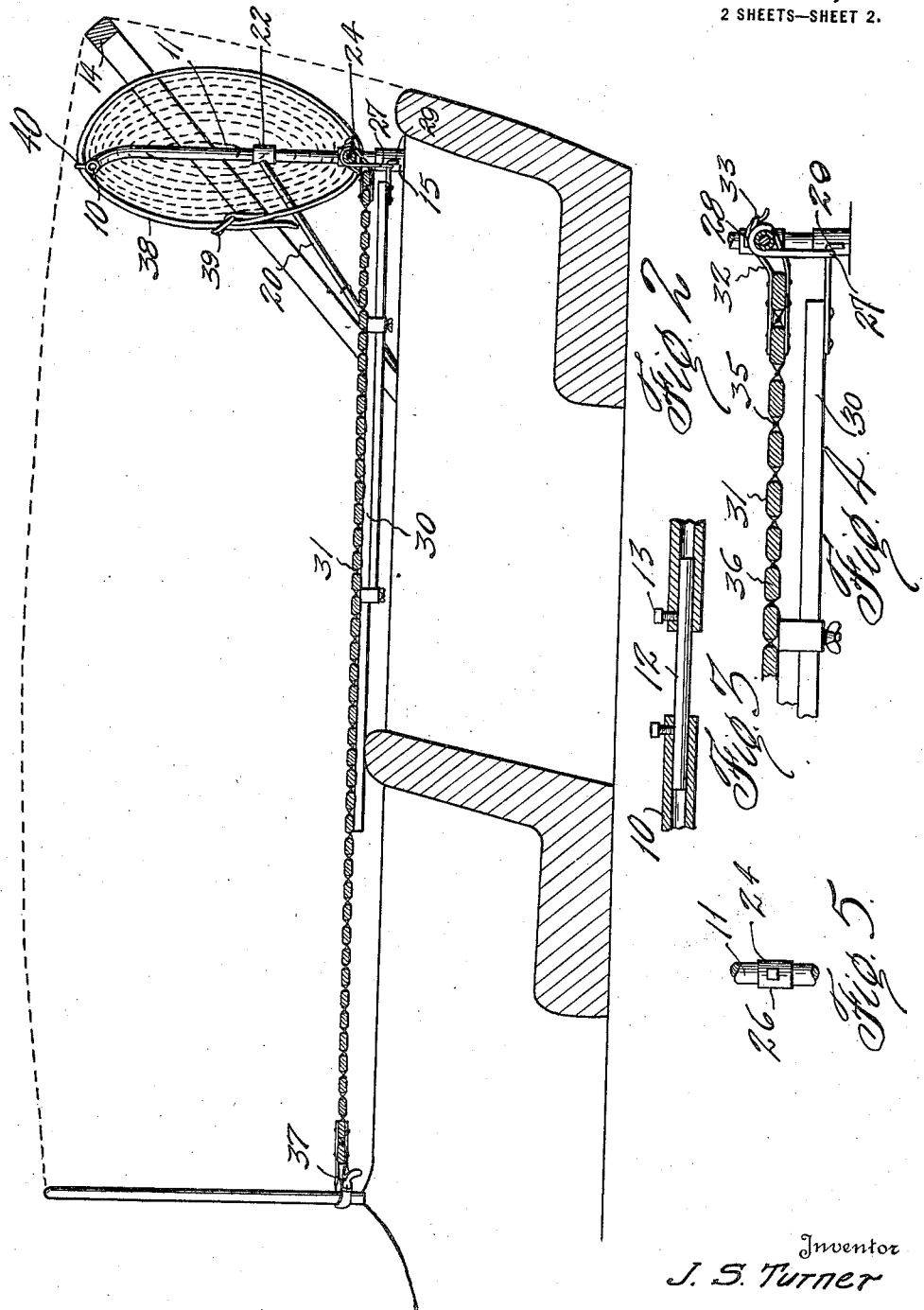

UNITED STATES PATENT OFFICE.

JOHN S. TURNER, OF DALLAS, TEXAS.

AUTOMOBILE-BED.

1,363,627.  Specification of Letters Patent.  Patented Dec. 28, 1920.

Application filed March 22, 1920. Serial No. 367,726.

*To all whom it may concern:*

Be it known that I, JOHN S. TURNER, a citizen of the United States, residing at Dallas, in the county of Dallas and State of Texas, have invented certain new and useful Improvements in Automobile-Beds, of which the following is a specification.

This invention relates to new and useful improvements in automobile beds, and is to some extent an improvement on my Letters Patent No. 1,325,967, issued December 23, 1919.

In the patent above referred to the cushions from the seats of the automobile were utilized in making the bed. In the present invention the seat cushions are not employed. The result sought is to provide a bed roll which is normally carried on a suitable support at the rear of the automobile and which may be readily unrolled to provide a support for a mattress and having sufficient rigidity to properly support the body of the sleeper and at the same time providing a comfortable bed.

In carrying out the invention a rack is mounted over the back of the rear seat and a head bar is secured to the rack transversely. This rack supports side rails which have their forward end resting on top of the backs of the front seat. A bed roll strip or apron has one end suitably attached to the head bar and is stretched over the side rails with its forward end suitably secured to the wind shield or front portion of the motor vehicle. When a mattress (not shown) is placed on top of this apron a very comfortable bed is made. The apron is arranged to be rolled up with the bed clothing, and suitably supported on the rack as by means of straps or other connections and is thus available for use at any time.

The invention will be more readily understood from a reading of the following specification and by reference to the accompanying drawings, in which an example of the invention is shown, and wherein:

Figure 1 is a perspective view of an automobile body with my improved rack and side rails attached thereto, Fig. 2 is a longitudinal sectional view of the same, Fig. 3 is a detail of the transverse rack adjustment, Fig. 4 is a detail showing the side rail hanger and the manner of attaching the apron to the head bar, Fig. 5 is a detail of the head bar fastening, and Fig. 6 is an enlarged sectional detail of the apron.

In the drawings the numeral 10 designates the transverse element of an arched rack having vertical side members or legs 11. The element 10 is split and connected by a bar 12 telescoping thereinto and held by set screws 13. By this arrangement the rack may be adjusted to automobile bodies of different widths. The member or element 10 may be offset laterally so that by reversing said element it may be positioned nearer the back bow 14. An upright socket 15 receives the lower end of each leg 11. The legs telescope into the sockets and are thus vertically adjustable, being held in adjusted positions by set screws 16. The rack may thus be vertically adjusted according to the height of the top of the car.

Each socket has a flange 17 at its bottom which is pivotally confined on the usual top-prop stud 18 of the automobile body, by means of a U-bolt 19. The rack may be swung forward or rearward and for holding it in position, diagonal braces 20 have their forward ends pivoted on the studs 21 of the bow 14. The braces carry collars 22 at their upper ends which loosely surround the legs 11 and are fastened in position thereon by set screws 23. By means of the braces the rack is held against swinging and is given more rigidity.

I provide a transverse head bar consisting of a tubular member 24 receiving shanks 25 extending laterally from collars 26 vertically adjustably fastened on the legs 11. Set screws 24' fasten the member 24 on the shanks, whereby the head bar is longitudinally adjustable to harmonize with the transverse adjustment of the element 10. U-shaped hangers 27 as is shown in Figs. 1 and 4, are provided with hooks 28 at their upper ends engaging over the upper side of the member 24. The hangers depend below the bar so that the down turned hooks 29 of side rails 30 may be easily inserted therein. The hooks 29 are fastened at one end of the side rails and on the underside of each. Each side rail is composed of longitudinal adjustable members so as to be extended and have their forward ends resting on top of the back of the front seat of the automobile.

A strip or apron 31 of suitable material is provided at one end with a plurality of straps 32 and buckles 33 whereby it may be attached to the head bar. The apron comprises a plurality of spaced transverse wooden slats 36 or it may be formed of other suitable material. The slats are connected by longitudinal strands 35 of flexible wire or connections interwoven with the slats as is shown in detail in Fig. 6. The slats extend transversely of the apron, thus permitting the apron to be rolled longitudinally, yet giving it sufficient rigidity when stretched over the side rails to properly support a mattress (not shown) and make a comfortable bed. Straps 37 are provided at the front ends of the apron for securing the same to the wind shield posts or other support of the automobile body. The bed is made up for sleeping with that end at the bar 24 as the head and, therefore, the bulk of the weight of the bodies of the sleepers being sustained by the side rails.

By unfastening the straps 37 the apron may be rolled up with the mattress and the bed clothes inside. The bedding is thus formed into a roll which is positioned within the rack between the element 10 and the head bar 24, as well as the legs 11. The term "bedding" as used herein is intended to cover the apron and mattress as well as sheets, blankets and other bed clothing.

Straps 38 held in place on the element 10 by loops 40 are provided with buckles 39 and are suspended from the said element. These straps are passed around the roll of bedding and under the bar 24, thus holding the bedding within the rack. The side rails 30 may be removed together with the hangers 27 and these parts stored under the rear seat or elsewhere. It is obvious that the bedding as carried in the rack is out of the way but is available for immediate use. The rack may be attached to any automobile without altering or defacing the same and is an attachment which may be easily placed in position in a short time without the aid of a skilled mechanic.

What I claim is:

1. The combination with sockets for connection with an automobile body near its sides, of an arched member having an adjustable transverse element and legs, said legs being adapted to be removably held within the sockets, a transverse longitudinally adjustable head bar mounted for vertical adjustment on the legs of the rack, and suspension means carried by the transverse element and adapted to sustain a roll of bedding which is connected with the head bar.

2. The combination with the rear sides of an automobile body, of an arched member supported on the sides of the body and vertically adjustable, said member having a transversely adjustable element at its top, a longitudinally adjustable head bar mounted on the member below the transverse element thereof, said head bar being vertically adjustable on the member, and suspension means carried by the transverse element of the member and adapted to sustain a roll of bedding between the element and the head bar.

3. The combination with the rear sides of an automobile body, of an arched member supported on the sides of the body and vertically adjustable, said member having a transversely adjustable element at its top, a longitudinally adjustable head bar mounted on the member below the transverse element thereof, said head bar being vertically adjustable on the member, suspension means carried by the transverse element of the member and adapted to sustain a roll of bedding between the element and the head bar, and diagonal rods adjustably connected with the sides of the arched member and extending forwardly for connection with the automobile body.

4. The combination with the rear sides of an automobile body, of an arched rack comprising a transverse adjustable element having depending legs, means for attaching the legs to the sides of the automobile body, means extending from the legs to the automobile body for supporting the rack in an upright position, a longitudinal adjustable head bar vertically adjustable on the legs, hangers mounted on the head bar which latter is disposed transversely of the rack, and bed supporting means having one end engaging the hangers.

5. In a device of the character described, an arched rack adapted to be arranged near the rear portion of an automobile body, said rack comprising a transverse element which is longitudinally extensible and legs depending from said element, means for securing the legs to said body, a transverse head bar connected with said legs, said head bar being longitudinally extensible, and means for supporting a roll of bedding within the rack between said transverse element and head bar.

6. In a device of the character described, an arched rack adapted to be arranged near the rear portion of an automobile body, said rack comprising an upper transverse element and depending legs, means for securing the legs to said body, elements vertically adjustably mounted upon said legs, means to clamp the elements to the legs in selected vertical positions, a head bar connected with the elements and supported thereby, and means for supporting a roll of bedding within the rack between the upper transverse element and head bar.

In testimony whereof I affix my signature.

JOHN S. TURNER.